United States Patent [19]

Allan et al.

[11] 4,268,410

[45] May 19, 1981

[54] POLYETHER POLYESTER SURFACTANTS, THEIR PRODUCTION AND USES

[75] Inventors: John J. Allan, Bramley; Richard G. Foster, Warlingham; Paul L. Leversidge, Epsom Downs, all of Great Britain

[73] Assignee: Honeywill-Atlas Limited, Great Britain

[21] Appl. No.: 58,542

[22] Filed: Jul. 17, 1979

[30] Foreign Application Priority Data

Jul. 31, 1978 [GB] United Kingdom ............... 31730/78

[51] Int. Cl.³ ..................... B01F 17/34; C07C 69/40; C07C 69/66; C11C 3/10
[52] U.S. Cl. .............................. 252/312; 252/174.21; 252/351; 252/356; 260/410; 260/410.6; 260/410.8; 424/170; 424/366
[58] Field of Search ............ 260/410.6, 410.8, 410 R; 252/174.21, 351, 356, 312

[56] References Cited

U.S. PATENT DOCUMENTS

| | | | |
|---|---|---|---|
| 2,761,784 | 9/1956 | Hall | 260/347.4 |
| 3,399,154 | 8/1968 | Bernstein | 260/410.6 |
| 3,634,245 | 1/1972 | Meisters | 252/49.3 |
| 3,720,695 | 3/1973 | Meisters | 260/404.8 |
| 4,055,393 | 10/1977 | Schafer | 260/410.6 |
| 4,097,403 | 6/1978 | Tsutsumi | 252/312 |

*Primary Examiner*—Dennis L. Albrecht

[57] ABSTRACT

Surfactants of a defined formula, typically prepared by reacting an alkoxylated hexitol fatty acid ester with a di- or tri-basic acid to induce a low degree of polymerization. The surfactants exhibit a higher viscosity in aqueous solution and in admixture with other conventional surfactants than the unpolymerized material.

5 Claims, No Drawings

POLYETHER POLYESTER SURFACTANTS, THEIR PRODUCTION AND USES

FIELD OF THE INVENTION

This invention relates to surfactants and to methods of making them and to their uses in emulsification. Typically, they are prepared by reacting an alkoxylated hexitol fatty acid ester with a di- or tri-basic acid to induce a low degree of polymerisation. The surfactants exhibit a higher viscosity in aqueous solution and in admixture with other conventional surfactants than the unpolymerised material.

RELATIONSHIP WITH THE PRIOR ART

Many non-ionic surfactants are known in which a polyhydroxy compound is alkoxylated with ethylene oxide to introduce hydrophilic character. Esters of such compounds with fatty acids such as lauric oleic and palmitic acids, are also known, and the addition of the fatty acid group gives the molecule part lipophilic character. Numerous publications describe these surfactants. Recent patents describing their uses are U.K. Pat. No. 1,496,494 and U.K. Pat. No. 1,489,150. The present invention includes compounds which are modifications of surfactants of this type, in which a low degree of polymerisation is induced by an ester forming reaction with a dibasic or tribasic acid.

DESCRIPTION OF THE INVENTION

Our invention provides surfactants characterised by the following general formula:

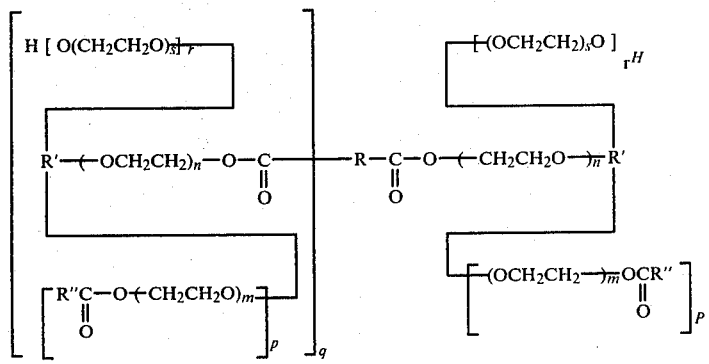

Where
R is a di- or trivalent hydrocarbon group;
R' is di- or higher-valent hydrocarbon group or heterocyclic group;
R" is a monovalent hydrocarbon group containing at least eight carbon atoms;
r and s=0 or an integer;
n, m, p and q are integers, being at least 1;
provided that:
n+m+rs=4 to 100 inclusive
r+p=2 to 7 inclusive
q=1 or 2
and further provided that up to 20 mole percent of the ethylene oxide groups may be replaced by propylene oxide groups.

Preferably R is the hydrocarbon residue of a dibasic or tribasic acid. Examples of such acids are polymethylene diacids such as malonic, succinic, adipic, pimelic, suberic and azelaic acids, polybasic acids or hydroxy acids such as malic, tartaric or citric acids, aromatic acids such as phthalic or trimellitic acids, and unsaturated diacids such as maleic or fumaric acid.

Preferably R' is the hydrocarbon residue or heterocyclic ring-containing residue of a polyol.

Examples of such polyols are sorbitol, sorbitan, isosorbide and mixtures thereof, other pentitol or hexitols or their anhydroderivatives, pentaerythritol, glycerol or glycols, such as ethylene glycol or propylene glycol.

Preferably R" is a $C_{9-22}$ saturated or unsaturated hydrocarbon group, such as may be derived from mono carboxylic acids having a $C_{9-22}$ hydrocarbon group attached to the acid group. Examples of these are acids derived from natural sources, including lauric, palmitic, oleic, stearic, and myristic acids.

The surfactants of the invention are prepared by a combination of etherification and esterification processes. Certain components may be pre-prepared and combined in a subsequent stage.

In a first process for preparing surfactants according to the invention, a polyol containing R' is reacted with an acid containing R", to form an ester. Thus sorbitol (perhaps in admixture with sorbitan and/or iso-sorbide) is reacted with a $C_{9-22}$ fatty acid under known esterification conditions. The product ester is then passed to the next stage, or a pre-formed or pre-prepared ester may be used in this stage, for example glycerol mono- or di-stearate or castor oil or sorbitan fatty acid esters. This second stage is an alkoxylation, under known conditions, using ethylene oxide. Small amounts (up to 20 mole percent) of the ethylene oxide may be replaced by propylene oxide, or a source thereof. From 4 to 100 moles of ethylene oxide per mole of ester are introduced, preferably 4 to 40 and, most preferably, 15 to 40 moles.

This alkoxylated product is used in the subsequent stage, or instead, a pre-prepared alkoxylated polyol mono-ester of a $C_{9-22}$ fatty acid may be used. Examples of such products are alkoxylated sorbitan esters.

The third stage of the process, which may of course be the only process required if pre-prepared materials are used, is to link alkoxylated polyol esters of $C_{9-22}$ fatty acids with a di- or tribasic acid. Preferably the acid is an organic acid of the type listed above, as examples of the source of the residue R. This process is carried out under conventional polyesterification conditions. The amount of acid used should provide about 0.5 to 1.8 times the number of acid groups needed to esterify half the hydroxyl groups present. Preferably, the molar ratio of acid:polyol ester is x:1 where x is the number of carboxyl groups in the acid. The reaction of polyethoxylated sorbitans with a dibasic acid requires about 3-10% by weight of acid.

Many of the surfactants according to the present invention possess an unusual property when mixed with water. It is known that certain ethoxylated materials which are miscible with water show an increase in viscosity as the amount of water in the mixture increases. Typically this increase may be of the order of ten times the viscosity of the undiluted surfactant. When a certain critical viscosity is reached, the viscosity falls again at higher water concentrations. With surfactants according to the invention, the critical viscosity may be a hundred or more times higher than the undiluted surfactant. This viscosity increase effect is advantageous in the preparation of formulations in the fields of cosmetics, pharmaceuticals and crop protection formulations. The viscosity increasing effect is noted in the presence of the ionic and nonionic surfactants and of emulsified oils.

The invention is illustrated by the following examples which include a comparison of the effect of dilution of the product surfactant, with the effect obtained using a conventional surfactant. Parts and percentages are by weight.

EXAMPLE 1

Ethoxylated sorbitan monolaurate containing an average of 20 molecules of ethylene oxide per mole of sorbitan (TWEEN 20 from Honeywill-Atlas Ltd.: 'TWEEN' is a trademark of ICI Americas Inc.) was used as the base material. 475 parts of vacuum dried material was introduced into a reactor, along with 25 parts succinic acid and 1.65 parts para-toluene sulphonic acid as catalyst.

The mixture was heated at 190°-200° C. for twelve hours. The acid number of the starting material was 48.5 and this fell to 1.3 by the end of the reaction period. The product of the reaction was found to contain about one succinic acid residue for two ethoxylated sorbitan laurate groups.

To determine the way viscosity changes upon dilution with water, a series of blends (at 10, 20, 30, 50 70 and 90% by weight) were made of the product of the example and water. Viscosity was determined using a Brookfield Viscometer at 12 revolutions per minute; and at a temperature of 21° C. The test was repeated at similar concentrations of ethoxylated sorbitan monolaurate (TWEEN 20), as used for the preparation of the surfactant according to the invention. Test at higher spindle speeds (60 r.p.m.) gave similar results, indicating Newtonian behaviour. Results are given in Table 1.

TABLE 1

| % by weight in water | Product of Example 1 Viscosity in cps | Tween 20 Viscosity in cps |
| --- | --- | --- |
| 10 | 24 | 8 |
| 20 | $1.25 \times 10^3$ | — |
| 30 | $2.2 \times 10^4$ | 24.5 |
| 50 | $3.7 \times 10^4$ | $2.3 \times 10^2$ |
| 70 | $7.5 \times 10^3$ | $7.5 \times 10^2$ |
| 90 | $2.6 \times 10^3$ | $5.9 \times 10^2$ |

10% by weight solutions of various commercial surfactants in water were prepared. The viscosity was measured under the conditions given above. To a second batch of similar solutions, 20% by weight of the product of the example was added and the viscosities measured. The results in Table 2 show how the increased viscosity shown in Table 1 is essentially unaffected by the addition of other surfactants.

TABLE 2

| Surfactant | Viscosity alone (cps) | Viscosity with 20% weight product of Example (cps) |
| --- | --- | --- |
| Sodium lauryl sulphate | 4.5 | $1.05 \times 10^4$ |
| Sodium lauryl ether sulphate | 5.0 | $3.0 \times 10^3$ |
| Ethoxylated (9) lauric acid | 10.0 | $7.7 \times 10^3$ |
| Ethoxylated (23) lauryl alcohol | 5.0 | $4.5 \times 10^3$ |
| Ethoxylated (30) stearic acid | 4.5 | $7.2 \times 10^3$ |
| Ethoxylated (60) sorbitan stearate | 3.0 | $6.0 \times 10^3$ |

EXAMPLES 2-11

A further series of compounds were prepared using sorbitan esters of various kinds, ethoxylated to varying degrees. Generally the molar ratio of ester to acid was 1:x where x = the number of carboxyl groups, but variation from this ratio was also investigated. Aliphatic and aromatic acids were used.

Method of preparation

The surfactant charge was based on dry weight material and was calculated from the theoretical molecular weight basis, as was that of the acid used, as given in Table 3 below.

The reactants were charged to a 5 liter flanged flask fitted with paddle stirrer, thermometer, nitrogen sparge and sampling tube (for removal of samples during preparation). 0.33% catalyst was added (p-toluene sulphonic acid was used: available as 60% aqueous solution and sold under name of ELTASOL TA.) The reactants were heated to reaction temperature (c. 180°-190° C.) and water of reaction (and water present in the surfactants) was removed through a condenser. Samples were removed periodically from the reaction mixture and the Acid number was determined by titration against standard sodium hydroxide solution, in order to follow the course of the reaction. The reaction was allowed to proceed to an Acid number of less than 2.0 and this was taken as completion.

TABLE 3

| Example No. | Surfactant used See Table 4 | Di- or Tri-basic acid used See Table 5 | Molar Ratio of Surfactant Acid | Approx Preparation Time (Hours) | Approx Temperature range °C. |
| --- | --- | --- | --- | --- | --- |
| 2 | A | K | 2:1.25 | 12 | 190-210 |
| 3 | A | K | 2:1.5 | 6.5 | 190-210 |
| 4 | A | M | 2:1 | 7.5 | 180-200 |
| 5 | A | N | 3:1 | 11 | 200-220 |
| 6 | A | O | 2:1 | 21 | 220-240 |
| 7 | A | L | 2:1 | 8.5 | 180-210 |
| 8 | C | K | 2:1 | 21 | 230-250 |
| 9 | B | K | 2:1 | 18 | 200-220 |
| 10 | D | K | 2:1 | 4 | 190-210 |
| 11 | E | K | 2:1 | 4.5 | 160-190 |

TABLE 4

| Surfactant Used | Trade Name* | CHEMICAL NAME |
| --- | --- | --- |
| A | TWEEN 20 | Polyoxyethylene(20)sorbitan monolaurate |
| B | G 7596 J | Polyoxyethylene(10)sorbitan monolaurate |
| C | G 7596 DJ | Polyoxyethylene(40)sorbitan monolaurate |
| D | TWEEN 60 | Polyoxyethylene(20)sorbitan monostearate |

TABLE 4-continued

| Surfactant Used | Trade Name* | CHEMICAL NAME |
|---|---|---|
| E | TWEEN 80 | Polyoxyethylene(20)sorbitan mono-oleate |

*Available from Atlas Chemical Industries N.V., Belgium or Honeywill-Atlas Ltd., U.K.

TABLE 5

| Acid Used | Name | Chemical Name |
|---|---|---|
| K | Succinic Acid | Butanedioic Acid |
| L | Adipic Acid | Hexanedioic Acid |
| M | Sebacic Acid | Decanedioic Acid |
| N | Citric Acid | 2-Hydroxy-1,2,3-Propane, Tricarboxylic Acid |
| O | Terephthalic Acid | 1,4-Benene Dicarboxylic Acid |

Evaluation of the above compounds (1) Viscosity of aqueous solutions at different concentrations Aqueous solutions at 10, 30, 50, 70 and 90% concentrations were prepared and viscosity measured at room temperature (25° C.) using a Brookfield Viscometer (spindle speed 12 rpm). Only those solutions that were stable for 24 hours were measured. Results are given in Table 6.

TABLE 6

| Material as prepared in Example No. | % Material in Water(Viscosity in CPS) | | | | |
|---|---|---|---|---|---|
| | 10 | 30 | 50 | 70 | 90 |
| 2 | 21 | 17000 | 27000 | 4350 | 2450 |
| 3 | 12.5 | 2550 | 10500 | 2500 | 1450 |
| 4 | 7.5 | 337.5 | 22500 | 1350 | 1500 |
| 5 | 53.5 | 50000 | 50000 | 12000 | 10000 |
| 6 | 7.5 | 1012.5 | 4500 | 2250 | 1900 |
| 7 | 37.5 | 1650 | 6250 | 2100 | 1400 |
| 8 | 7.5 | 812.5 | 5500 | 2650 | 1250 |
| 9 | — | 712.5 | 2550 | 1650 | 1600 |
| 10 | — | — | — | — | — |
| 11 | — | — | — | — | 4400 |

— signifies unstable solution after 24 hours.

(2) Viscosity of 30% aqueous solutions at different temperatures

30% aqueous solutions were prepared and viscosity readings taken at different temperatures. The Brookfield Viscometer was used (spindle speed 12 rpm). Some of the solutions were unstable at the temperatures used and so a viscosity reading was not obtained. Results are given in Table 7.

TABLE 7

| MATERIAL OF EXAMPLE No. | TEMPERATURE°C.(Viscosity in CPS) | | | |
|---|---|---|---|---|
| | 25 | 50 | 70 | 100 |
| 2 | 17000 | 450 | — | — |
| 3 | 2550 | 197 | 28 | — |
| 4 | 337.5 | 55 | — | — |
| 5 | 50000 | 1562.5 | 165 | — |
| 6 | 1012.5 | 87.5 | — | — |
| 7 | 1650 | 165 | 27.5 | — |
| 8 | 812.5 | 150 | 40 | 15 |
| 9 | 812.5 | 92.5 | — | — |
| 10 | — | — | — | — |
| 11 | — | — | — | — |
| A* | 21.5 | 10 | 8.5 | 7 |
| D* | — | — | — | — |
| E* | 315 | 40 | 55 | 45 |
| B* | 17.5 | 25 | 15 | — |
| C* | 50 | 12.5 | 7.5 | 7.5 |

— signifies unstable solution at that temperature.
*for comparison the original surfactant (see Table 4) was also tested.

(3) Foam Volume

Foam volumes were determined using 1% aqueous solutions. The Ross-Miles test was used. Temperature was 25° C. The foam volume was recorded at the start, after 1 minute, and after 10 minutes. Therefore, an estimation of the foaming ability and of the foam stability could be obtained. Results are given in Table 8.

TABLE 8

| MATERIAL OF EXAMPLE No. | Foam Volume of 1% Aqueous Solution | | |
|---|---|---|---|
| | TIME (MINUTES) (FOAM VOLUME mls) | | |
| | Immediately | 1 Minute | 10 Minutes |
| 1 | 294 | 255 | 245 |
| 2 | 314 | 274 | 274 |
| 3 | 294 | 274 | 255 |
| 4 | 265 | 245 | 225 |
| 5 | 304 | 284 | 265 |
| 6 | 274 | 245 | 235 |
| 7 | 284 | 265 | 265 |
| 8 | 235 | 216 | 196 |
| A* | 304 | 274 | 265 |
| E* | 304 | 274 | 78 |
| B* | 294 | 274 | 118 |

*for comparison the original surfactant (see Table 4) was also tested.

(4) Modification of Emulsion Viscosity

The following emulsions were prepared. Quantities are parts by weight.

| COMPONENTS | EMULSION | | | |
|---|---|---|---|---|
| | (i) | (ii) | (iii) | (iv) |
| Mineral oil | 8 | 8 | 8 | 8 |
| Span* 80/Tween 80 Wt ratio (42/58) | 2 | 2 | 2 | 2 |
| Product of Example 1 | 0 | 5 | 10 | 15 |
| Water | 90 | 85 | 80 | 75 |

| | (v) | (vi) | (vii) | (viii) |
|---|---|---|---|---|
| White spirit | 9 | 9 | 9 | 9 |
| Span* 80/Tween 80 Wt ratio (18/82) | 1 | 1 | 1 | 1 |
| Product of Example 1 | 0 | 5 | 10 | 15 |
| Water | 90 | 85 | 80 | 75 |

*Span 80 is sorbitan monoleate, sold by Honeywill-Atlas Ltd. SPAN is a trademark of ICI Americals Inc. and Honeywill-Atlas are registered users.

Viscosity was recorded at 28° C. using a Brookfield Viscometer (spindle speed 12 rpm) and is reported in Table 9.

TABLE 9

Emulsion Viscosity increase with Product of Example 1.

| EMULSION | VISCOSITY cps | COMMENTS ON EMULSION STABILITY |
|---|---|---|
| (i) | 7.5 | Stable after 1 hour |
| (ii) | 27.5 | Stable after 1 hour |
| (iii) | 40.5 | Unstable |
| (iv) | 140 | Unstable |
| (v) | 7.5 | Slight creaming after 1 hour |
| (vi) | 23.5 | Stable after 1 hour |
| (vii) | 62.5 | Unstable |
| (viii) | 152.5 | Unstable |

(5) Viscosity of solutions at low concentrations

Viscosity measurements were made at 25° using "U" tube viscometers. Distilled water was used as solvent. Results are given in Table 10.

TABLE 10

Viscosity of low concentration solutions

| Concentration % | Viscosity in centistokes | |
|---|---|---|
| | Product of Ex. 1 | Product of Ex. 5 |
| 2.5 | 1.1 | 1.3 |
| 5.0 | 1.6 | 2.8 |
| 7.5 | 2.6 | 13.5 |
| 10.0 | 4.9 | 181.0 |
| 12.5 | 11.5 | 1493.2 |
| 15.0 | 29.5 | 8726.2 |

We claim:

1. An aqueous solution containing from 10 to 90% by weight of a surfactant prepared by the reaction of
   (a) an ethoxylated $C_{9-22}$ fatty acid ester of sorbitan, ethoxylated with 4 to 40 mols of ethylene oxide per mol of ester, provided that up to 20 mol percent of ethylene oxide may be replaced by propylene oxide and
   (b) a di- or tri- basic acid in which the amount of acid used in the reaction is such as to provide from 0.5 to 1.8 times the number of acid groups needed to esterify half the hydroxyl groups present in the ethoxylated sorbitan ester.

2. An aqueous surfactant solution according to claim 1 in which the weight of acid used in the reaction is from 3–10% of the weight of the ethoxylated sorbitan ester.

3. An aqueous surfactant solution according to claim 1 or claim 2 in which the molar ratio of ethoxylated sorbitan ester to acid is 2:1 in the case of dibasic acids or 3:1 in the case of tribasic acids.

4. An aqueous solution according to claim 1 or claim 2 in which the concentration of the surfactant is from 10% to 30% by weight.

5. An emulsion of a water-immiscible oil in water, in which 5–15% by weight of the total emulsion weight is provided by a surfactant containing an aqueous solution said surfactant being prepared by the reaction of
   (a) an ethoxylated $C_{9-22}$ fatty acid ester of sorbitan, ethoxylated with 4 to 40 mols of ethylene oxide per mol of ester, provided that up to 20 mol percent of ethylene oxide may be replaced by propylene oxide and
   (b) a di- or tri- basic acid in which the amount of acid used in the reaction is such as to provide from 0.5 to 1.8 times the number of acid groups needed to esterify half the hydroxyl groups present in the ethoxylated sorbitan ester.

* * * * *